United States Patent [19]

Moehle et al.

[11] Patent Number: 4,942,145

[45] Date of Patent: Jul. 17, 1990

[54] PRECERAMIC COMPOSITIONS AND CERAMIC PRODUCTS

[75] Inventors: William E. Moehle; John J. Rogers; John Semen, all of Baton Rouge, La.

[73] Assignee: Ethyl Corporation, Richmond, Va.

[21] Appl. No.: 357,542

[22] Filed: May 26, 1989

[51] Int. Cl.[5] .................... C04B 35/52; C04B 35/54; C04B 35/56; C04B 35/58

[52] U.S. Cl. ........................................ 501/90; 501/88; 501/92

[58] Field of Search ............................. 501/90, 88, 92

[56] References Cited

U.S. PATENT DOCUMENTS 4,777,234 10/1988 Litt et al. .............................. 528/37
4,835,207 5/1989 Semen et al. ....................... 524/443

*Primary Examiner*—William R. Dixon, Jr.
*Assistant Examiner*—Alan A. Wright
*Attorney, Agent, or Firm*—Patricia J. Hogan

[57] ABSTRACT

Preceramic molding compositions capable of forming low density ceramics having acceptable strength and improved wear resistance are compositions having a particle size not larger than about 105 micrometers and comprising an intimate mixture of (A) about 50-90 parts by weight of powder ingredients comprising about 2-50% by weight of graphite powder and about 98-50% by weight of a second powder selected from silicon carbide, silicon nitride, and mixtures thereof and (B) correspondingly, about 50-10 parts by weight of a preceramic polysilazane binder.

7 Claims, No Drawings

PRECERAMIC COMPOSITIONS AND CERAMIC PRODUCTS

Field of Invention

This invention relates to polysilazane-derived ceramics having improved wear resistance and to preceramic compositions useful for preparing them.

BACKGROUND

As disclosed in U.S. Pat. Nos. 4,482,669 (Seyferth et al.-I), 4,645,807 (Seyferth et al.-II), 4,650,837 (Seyferth et al.-III), and 4,659,850 (Arai et al.), it is known that polysilazanes are useful as preceramic materials; and Seyferth et al.-I teach that their polysilazanes are especially useful as binders for ceramic powders, such as silicon carbide and silicon nitride.

Copending applications Ser. No. 120,102 (Semen et al.-I), filed Nov. 13, 1987; Ser. No. 193,105 (Semen et al.-II), filed May 12, 1988; and Ser. No. 233,369 (Semen et al.-III), filed Aug. 18, 1988, teach that low density polysilazane-derived ceramics having improved strength can be obtained by employing as preceramic molding compositions certain intimate mixtures of silicon carbide or silicon nitride with polysilazanes in which the particle size of the mixtures has been reduced to not larger than about 105 micrometers.

The preceramic compositions of Semen et al.-I, II, and III provide ceramics which are useful in many applications. However, in other applications, such as pump parts, they do not have as much wear resistance as might be desired.

Lewis, *Materials Engineering*. Vol. 106, No. 5, pp. 39–41, May, 1989, states that the presence of a high level of residual graphite in silicon carbide gives excellent wear resistance in such applications as sand slurry pump seals, water pumps, and bearings and seals for corrosive and abrasive service.

SUMMARY OF INVENTION

An object of this invention is to provide novel preceramic molding compositions.

Another object is to provide such compositions which are capable of forming low density ceramics having acceptable strength and improved wear resistance.

These and other objects are attained by (A) intimately mixing (1) about 50–90 parts by weight of powder ingredients comprising about 2–50% by weight of graphite powder and about 98–50% by weight of a second powder selected from silicon carbide, silicon nitride, and mixtures thereof with (2) correspondingly, about 50–10 parts by weight of a preceramic polysilazane binder and (B) reducing the particle size of the mixture to a size such that all of the particles pass through a 105 micrometer sieve.

DETAILED DESCRIPTION

Graphite powders that can be employed in the practice of the invention are commercially-available materials that vary from very fine to coarse powders. The particle size of the graphite powder is not critical, but processing is facilitated by the use of powders having a particle size of less than about 100 micrometers, preferably about 0.1–10 micrometers.

Silicon carbide and silicon nitride powders which are utilizable separately or in admixture as the second powder are also commercially-available materials that vary from very fine to coarse powders. The preferred second powders are those which have a particle size of about five micrometers or less, preferably one micrometer or less; and it is generally preferred that these powders have a mean particle size of about 0.1–1.0 micrometer.

The amounts of powders employed are such that the graphite constitutes about 2–50%, preferably about 10–15%, of the combined weights of the powders.

The binder that is mixed with the powders is a polysilazane, e.g., a polysilazane of Seyferth et al.-I, II, or III, or Arai et al., the teachings of all of which are incorporated herein in toto by reference. However, it is preferably a polysilazane of the type taught by Seyferth et al.-I, i.e., a polysilazane prepared by reacting an organodihalosilane, such as methyldichlorosilane, with ammonia; treating the ammonolysis product with potassium hydride or other basic catalyst which is capable of deprotonating an NH group that is adjacent to an SiH group; and quenching the resultant product with an electrophilic quenching reagent, such as methyl iodide or dimethylchlorosilane; or a mixture of such polysilazanes.

The utilizable polysilazanes are solids which are soluble in common organic solvents, such as aliphatic or aromatic hydrocarbons, dialkyl or alicyclic ethers, etc., including solid mixtures of normally solid polysilazanes and normally liquid polysilazanes. The solid, soluble polysilazanes having the higher molecular weights are ordinarily preferred to permit the use of faster pyrolysis rates.

When good strength retention at elevated temperatures is desired, the polysilazane that is utilized should have an alkali metal content not higher than about 100 ppm, preferably not higher than about 5 ppm. When the polymer as prepared contains more than that amount of alkali metal contaminant, the degree of contamination can be reduced in any suitable manner, such as by filtration of a solution of the polysilazane in an organic solvent.

The amount of polysilazane used is such that the preceramic molding compositions of the invention comprise about 50–90%, preferably about 70–80%, by weight of the powders and about 50–10%, preferably about 30–20%, by weight of the binder.

If desired, the compositions may be modified by the inclusion of optional ingredients, such as polyisobutenyl succinimides, other dispersing agents, and other additives, such as oxidation inhibitors, that have been used in known ceramic molding compositions. When employed, such additives are used in minor amounts. For example, dispersing agents are typically used in concentrations of not more than about 5% by weight.

Ceramics may be prepared from the preceramic compositions by molding them at a temperature and pressure suitable for the parts being made, usually at a temperature of about 60°–225° C. and a pressure of about 6.8–343 MPa, using any suitable shaping process, such as compression, injection, or transfer molding, or extrusion, and then pyrolyzing the molded composition in an inert atmosphere, such as nitrogen, argon, etc., to a temperature of about 1200°–1450° C., preferably about 1300° C. The time required for the pyrolysis varies with the ultimate pyrolysis temperature, being at least one hour at the preferred pyrolysis temperature, a shorter time at higher temperatures, and a longer time at lower temperatures.

The invention is advantageous in that the inclusion of the graphite in the preceramic molding compositions makes them capable of providing low density ceramics having acceptable strength and better wear resistance than the ceramics obtained from the most closely comparable preceramic compositions of Semen et al.

The following examples are given to illustrate the invention and are not intended as a limitation thereof. In the processes described in these examples, thoroughly-dried equipment, purified raw materials, and an inert atmosphere were used to protect the polysilazanes from attack by water and other substances having active hydrogens during synthesis, processing, and storage.

EXAMPLE I

Synthesis of Polysilazane

Part A

A suitable reaction vessel was charged with 15.4 L of anhydrous tetrahydrofuran and cooled to about $-10°$ C., after which 1970 g (17.12 mol) of methyldichlorosilane was added to the vessel, and stirring at about 60 rpm was begun. A slow steady stream of 885 g (51.96 mol) of anhydrous ammonia gas was introduced into the vessel at a flow rate such that the reaction pressure was maintained at or below 400 kPa and the reaction temperature stayed in the range of $0°-10°$ C. Then the reaction mixture was stirred at $0°$ C. for about three additional hours, after which the reaction mixture was allowed to warm to ambient temperature while the system was under gentle nitrogen purge to allow the majority of the excess ammonia to vent off. Then the reaction mass was centrifically filtered to remove the ammonium chloride by-product particulates and to yield a clear liquid phase. The centrifugate cake was washed with 2-3 L of anhydrous tetrahydrofuran to yield an additional clear liquid phase, which was combined with the previous liquid phase.

Part B

The liquid phase obtained from the ammonolysis reaction of Part A was charged into a stirred reactor that was jacketed with coolant at $0°$ C. Next 10.61 g (0.264 mol) of potassium hydride powder was added to the reactor, and the reactor was then stirred at $0°$ C. for 22 hours. Then 125.16 g (1.323 mol) of dimethylchlorosilane was added to the reaction mixture to quench the polymerization reaction. After several additional hours of stirring, anhydrous ammonia gas was bubbled through the reactor for a few minutes to neutralize the excess dimethylchlorosilane. After warming to ambient temperature, the reaction liquid was concentrated by vacuum rotoevaporation to about 3 L of solution. The concentrated solution was pressure filtered through a 0.2 micron Teflon filter to yield 3320 g of a clear solution containing 18.8% by weight of non-volatile solids.

The solid phase of the solution thus prepared had a proton NMR spectrum consistent with that of the polysilazanes of Seyferth et al.-I, an elemental potassium content of less than 5 ppm, an elemental chlorine content of less than 7 ppm, and a weight-average molecular weight of about 8800, as determined by GPC in tetrahydrofuran solvent, using narrow molecular weight distribution polystyrenes as the calibration standards.

EXAMPLE II

Preparation of Molding Formulation

A suitable vessel was charged with 133 g of the polysilazane solution prepared in Example I (25.0 g of dry polymer residue), 65 g of a silicon carbide powder having a particle size of 0.65 micrometer, 10 g of graphite powder having a particle size of less than 44 micrometers, and 0.5 g of a commercial polyisobutenyl succinimide dispersant. This mixture was mechanically stirred for about 30 minutes, then ultrasonicated for about 45 minutes to disperse the powders, then vacuum rotoevaporated at ambient temperature to form a non-flowing residue, and then vacuum dried for several days. The dried residue was ground lightly with a mortar/pestle to reduce it to $-30$ mesh powder, i.e., a powder having a particle size less than 590 micrometers. The $-30$ mesh powder and about 200 mL of silicon carbide milling balls having a diameter of about 0.6 cm were placed in a 1.4 L ceramic mill jar, which was then roller milled for about two hours. The roller milled material was dry-sieved with a U.S. Standard No. 140 screen to obtain 54.8 g of $-140$ mesh molding formulation powder, i.e., a powder having a particle size of less than about 105 micrometers.

EXAMPLE III

Preparation of Ceramic Test Specimens

Part A

A green molded rod specimen was prepared from the molding formulation powder of Example II in a steel mold having a split cavity which was nominally about one cm in diameter by 12.7 cm long. The mold cavity was coated with a silicone mold release agent, and the mold was then heated to $120°-130°$ C. and filled with 4.6-5.5 g of the molding formulation powder. The filled mold was evacuated to a pressure of 66.7 Pa, and the evacuated mold was uniaxially pressed for about five minutes with a force of 13.3 kN (173 MPa applied pressure), after which the mold was allowed to cool under no applied load for about 15 minutes, and the molded rod specimen was then removed from the mold.

Part B

The green rod of Part A was pyrolyzed to a ceramic rod in a tube furnace equipped with an alumina process tube by (1) quickly loading the green rod into the process tube, (2) evacuating and back-flushing the process tube with dry nitrogen gas several times to establish a dry nitrogen atmosphere, (3) putting the process tube under nitrogen purge at 14.2 L per hour, and (4) pyrolyzing the rod under nitrogen purge gas by heating it from room temperature to $60°$ C. at a rate of $60°$ C./hour, heating from $60°-260°$ C. at a rate of $30°$ C./hour, heating from $260°-1300°$ C. at a rate of $120°$ C./hour, holding at $1300°$ C. for one hour, cooling to $1100°$ C. at a rate of $120°$ C./hour, and cooling to below $100°$ C. at the ambient rate determined by shutting off the heater. The resulting pyrolyzed specimen was a black rod having nominal dimensions of 0.9 cm in diameter by 2.5-3.0 cm in length, a density of 2.18 g/cc, a bending strength of 15.9 kg/mm$^2$, and a specific strength of 7.3 (kg/mm$^2$)/(g/cc).

EXAMPLE IV

Testing of Ceramic Specimens

The ceramic rod of Example III was subjected to a rotary wear test in which it was mechanically held against a rotating unlubricated stainless steel wheel having a diameter of 10.2 cm for 10 hours on a specimen arm which had a weight of 25-50 g applied to it. Both the test specimen and the wheel were weighed before and after the test, and it was found that the combined weight loss of the specimen and wheel effected by the test was less than 0.05 g. This compares with a combined weight loss of more than 1.0 g that was suffered when Examples II-IV were repeated except that the test specimen was made from a formulation in which the 10 g of graphite powder was replaced with an additional 10 g of the silicon carbide powder.

It is obvious that many variations may be made in the products and processes set forth above without departing from the spirit and scope of this invention.

What is claimed is:

1. A preceramic molding composition having a particle size not larger than about 105 micrometers and consisting essentially of an intimate mixture of (A) about 50-90 parts by weight of powder ingredients comprising about 2-50% by weight of graphite powder and about 98-50% by weight of a second powder selected from silicon carbide, silicon nitride, and mixtures thereof and (B) correspondingly, about 50-10 parts by weight of a preceramic polysilazane binder.

2. The composition of claim 1 wherein the second powder is silicon carbide.

3. The composition of claim 1 wherein the binder consists essentially of at least one polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent.

4. The composition of claim 3 wherein the organodihalosilane is methyldichlorosilane and the basic catalyst is potassium hydride.

5. The composition of claim 1 wherein the binder has an alkali metal content of 0-100 ppm.

6. The composition of claim 1 consisting essentially of an intimate mixture of (A) about 70-80 parts by weight of powder ingredients comprising about 10-15% by weight of graphite powder and about 90-85% by weight of silicon carbide and (B) correspondingly, about 30-20 parts by weight of a preceramic polysilazane binder which (1) has an alkali metal content of 0-5 ppm and (2) consists essentially of at least one polysilazane prepared by reacting methyldichlorosilane with ammonia, treating the ammonolysis product with potassium hydride, and quenching the resultant product with an electrophilic quenching reagent.

7. A ceramic derived from a composition of claim 1 by molding it at a temperature of about 60°-225° C. and a pressure of about 6.8-343 MPa and then pryolyzing the molded composition in an inert atmosphere to a temperature of about 1200°-1450° C.

* * * * *